Feb. 8, 1938.  B. E. FOLKE ET AL  2,107,662
RATCHET MECHANISM
Filed Dec. 29, 1936  2 Sheets-Sheet 1
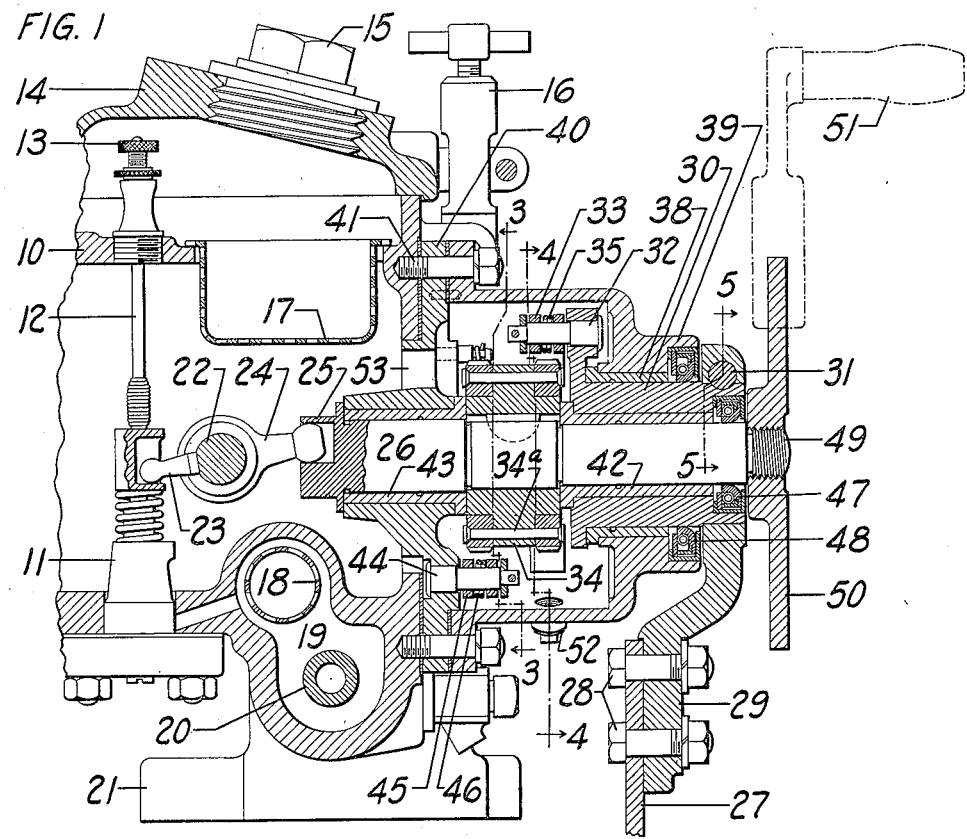
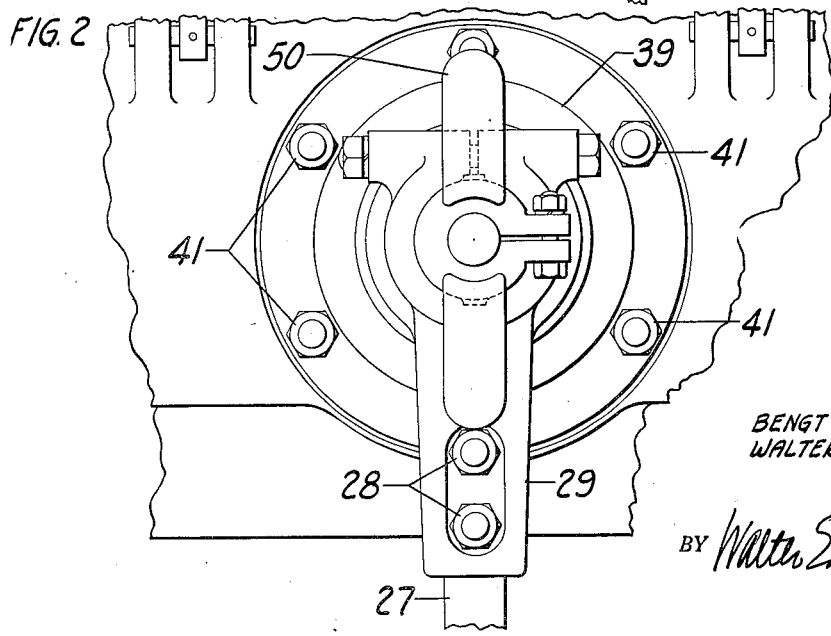
BENGT E. FOLKE
WALTER E. WOLLHEIM
INVENTORS.
BY Walter E. Wollheim
ATTORNEY.

Feb. 8, 1938.  B. E. FOLKE ET AL  2,107,662
RATCHET MECHANISM
Filed Dec. 29, 1936  2 Sheets-Sheet 2
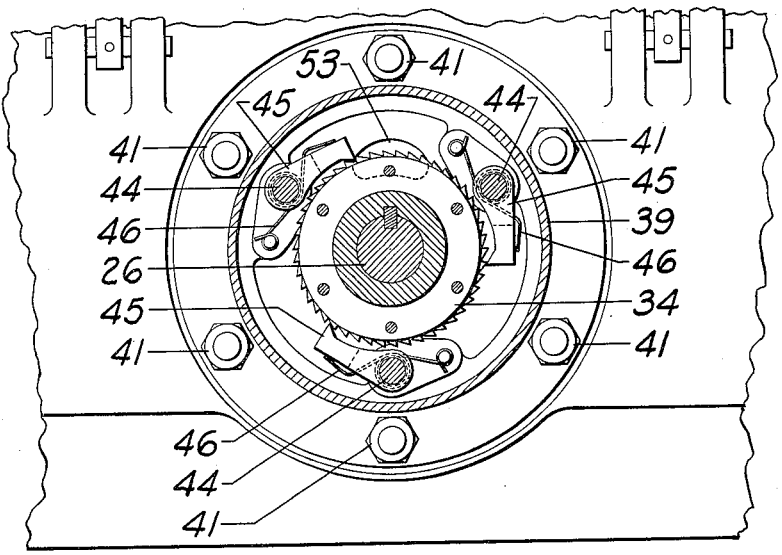
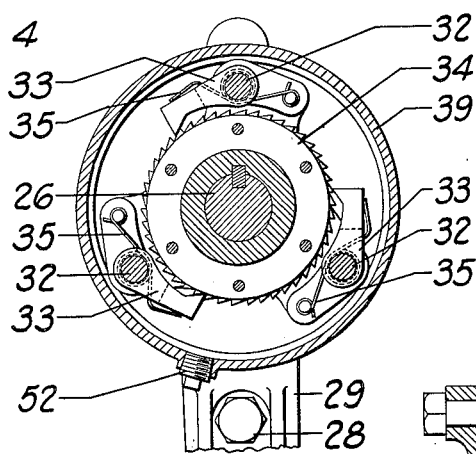
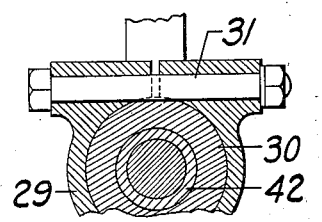
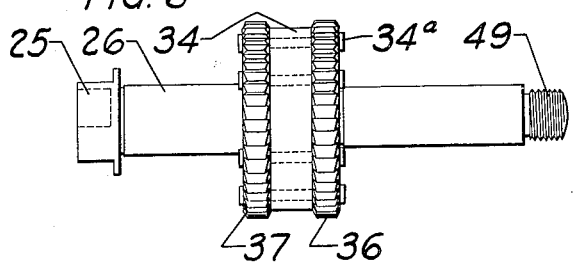
BENGT E. FOLKE
WALTER E. WOLLHEIM
INVENTORS.
BY Walter E. Wollheim
ATTORNEY.

Patented Feb. 8, 1938

2,107,662

UNITED STATES PATENT OFFICE 2,107,662

RATCHET MECHANISM

Bengt E. Folke, Mamaroneck, and Walter E. Wollheim, New York, N. Y., assignors to Nathan Manufacturing Company, New York, N. Y., a corporation of New York Application December 29, 1936, Serial No. 118,063

5 Claims. (Cl. 184—27)

This invention relates to certain new and useful improvements in ratchet drive mechanisms as used with mechanical force feed lubricators or similar devices.

One of the principal objects of the invention is to provide a self-contained, oil lubricated ratchet drive unit, which may be readily removed for inspection without disturbing any of the inner working parts of the lubricator.

Another object is to provide a self-contained ratchet unit, which is lubricated by the main supply of oil in the lubricator, eliminating the necessity for any exterior means for manually lubricating the ratchet mechanism.

A further object is to provide a ratchet drive mechanism so arranged as to retain a sufficient amount of lubricant inside the ratchet housing to lubricate properly the working parts of the ratchet irrespective of the level of the oil in the main reservoir.

Still another object is to place the ratchet drive mechanism of the unit in a body of oil contained in a housing separated from the main lubricator reservoir, so as to prevent the oil in the main reservoir from becoming aerated due to the splashing caused by the rapidly moving parts of the ratchet. This latter object is particularly important for lubricators used on railway locomotives operating at high speed.

Another object is to provide a self-contained ratchet drive mechanism with bearings at both ends of the ratchet shaft, the latter being supported independently of the lubricator body.

Other objects will become apparent in the following specifications and the accompanying drawings in which a preferred embodiment of the invention is shown.

In the drawings,

Fig. 1 is a fragmentary cross-sectional view of a force feed lubricator embodying our invention;

Fig. 2 is a front elevation of the ratchet drive unit also showing a fragmentary part of the lubricator;

Fig. 3 is a cross-sectional view partially in elevation, along the plane of line 3—3 in Fig. 1;

Fig. 4 is a cross-sectional view partially in elevation, along the plane of line 4—4 in Fig. 1;

Fig. 5 is a cross-sectional view along the plane of line 5—5 in Fig. 1; and

Fig. 6 is an elevation of the ratchet gear unit mounted on the ratchet shaft.

Like characters of reference denote similar parts throughout the several views and the following specification.

Referring to Fig. 1, 10 is a lubricator casing containing a suitable number of pumping units 11, indicator rods 12 and adjusting screws 13. The casing is closed by a cover 14 and provided with a cap 15 held in position by a suitable locking arrangement 16. The lubricator body is provided with oil strainers 17 and 18. A chamber for heating the oil is provided at 19 with a suitable heating element as at 20. A bracket 21 is provided for attaching the lubricator to, for example, a locomotive engine.

The pumping units 11, which may be of the well-known valveless type, are actuated by a sliding shaft 22 and ball pins 23. Sliding shaft 22 obtains its movement from driving ball arm 24, actuated by an eccentrically located bore 25 at the extension of a ratchet shaft 26.

The elements so far recited are substantially the same as those shown and described in Patent #1,722,136 issued July 23, 1929, to Louis Friedmann.

Oscillating movement of the desired degree is imparted to a ratchet lever 27 from a suitable part of, for example, a locomotive valve gear in the usual well-known manner and need not be described here. Ratchet lever 27 is attached by means of bolts 28 to ratchet drive arm 29, securely attached to driving pawl support 30 by means of holding bolt 31, illustrated also in Fig. 5. Referring now to Figs. 1 and 4, each of driving pawl pins 32 supports a driving pawl 33, which is held in contact with a ratchet wheel 34 by means of a pawl spring 35. The ratchet wheel unit 34, which is clearly illustrated in Fig. 6, is keyed to the shaft 26 and is provided with a gear 36 at one end, actuated by the driving pawls 32 and a gear 37 at its other end for engagement with counterpawls 45, which will be referred to later. The gears 36 and 37 are fixedly secured to the unit 34 by means of rivets 34a.

The driving pawl support 30 is mounted in a bearing 38 located in a cup-shaped ratchet housing 39. Ratchet housing 39 and a counterpawl support plate 40, which latter also serves to close the open end of the housing, are attached as a unit by means of stud bolts 41 to the lubricator body.

Ratchet shaft 26 is supported at its outer end in a bearing 42, which is part of the driving pawl support 30, and at its inner end in a bearing 43, which is part of counterpawl support plate 40. Referring to Figs. 1 and 3, counter pawl pins 44 support counter pawls 45, mentioned above, which are held in contact with the ratchet wheel by counter pawl springs 46. Counterpawl support plate 40 is provided with a small opening 53 so located as to trap a sufficient amount of oil within the ratchet housing 39 for lubrication of the working parts at all times.

To prevent leakage of oil at the outer end of the ratchet shaft and driving pawl support, oil seals 47 and 48 are provided at these points. The ratchet shaft 26 is provided with an extension 49, which carries a lever 50 arranged to be manually rotated by a suitable crank 51, shown in dotted lines, for the purpose of obtaining rapid actuation of the pumping units as may be necessary at times, for example, to fill the oil lines.

A drain plug 52 is located at the bottom of the ratchet housing for the purpose of draining off sediment, which might otherwise accumulate at this point.

It is obvious that when oil is poured into the lubricator casing 10 through filling plug 15, oil will also flow through opening 53 in the counterpawl support plate 40 and fill the ratchet housing 39. Should the level of the oil in the main lubricator gradually recede and fall below the level of the aperture 53, the oil within the ratchet housing 39 will remain at a level high enough to insure proper lubrication of all the working parts within the housing. The seals 47 and 48 prevent oil leaks around the shaft 23 and pawl support 30. Each time the casing 10 is filled with oil, whatever amount of oil in the ratchet housing 39 should have been consumed will be replaced automatically.

The entire ratchet housing 39 with its mechanism, and the counter pawl support plate 40 can be readily removed from the lubricator body 10 by unscrewing the nuts from studs 41 and slipping off the entire unit after the lever 27 has been disconnected from its operating medium. The bore 25 of the shaft 26 permits the shaft to become easily disengaged from the lubricator pumping mechanism proper which is not disturbed at all.

The shaft 26 is substantially supported at both ends in, respectively, the counterpawl support plate 40 and the driving pawl support 30 entirely independent of the lubricator body which greatly facilitates replacement.

All parts within the ratchet housing running in oil at all times, wear of these parts is reduced to a minimum. No outside means, such as oil cups for instance, need be used to lubricate these parts. An added advantage of the ratchet mechanism running in a separate oil chamber is that the oil in the main reservoir is not disturbed or aerated by the rapid motion of the ratchet parts.

While we have shown in the drawings and described in the specification a preferred embodiment of our invention, we do not wish to limit ourselves to the particular construction disclosed, but wish it to be understood that various changes in the form, proportion and combination of parts and minor details of construction may be resorted to without departing from the principles or sacrificing any of the advantages of the invention, as defined in the appended claims.

What we claim as new, is:

1. In combination with a force feed lubricator having a main oil reservoir, pumping units and a transverse shaft forming an actuating member therefor within the reservoir, the said shaft having a laterally sliding and vertically rocking motion, mechanism for directly operating said member adapted to be withdrawn entirely from one side of the lubricator as an assembled unit, the said mechanism containing an independent oil reservoir receiving its supply of oil from the main oil reservoir of the lubricator.

2. In combination with a force feed lubricator having a main oil reservoir, pumping units and a transverse shaft forming an actuating member therefor within the reservoir, the said shaft having a laterally sliding and vertically rocking motion, mechanism consisting of a ratchet device comprising a housing and shaft journalled in the housing, gears upon the shaft, pawls and counterpawls in operative connection with the shaft, the said housing having an aperture above the said shaft for admission of oil from the main reservoir of the lubricator to the housing, means exteriorly of the housing to operate the shaft and means at the end of the said shaft and within the main reservoir to operate directly the actuating member of the said pumping units, the said mechanism being adapted to be withdrawn entirely from one side of the lubricator as an assembled unit.

3. In combination with a force feed lubricator having a main oil reservoir, pumping units and a transverse shaft forming an actuating member therefor within the reservoir, the said shaft having a laterally sliding and vertically rocking motion, mechanism for directly operating said member having a housing therefor exteriorly of the lubricator, the said mechanism being adapted to be withdrawn entirely from one side of the lubricator, and the said housing having an aperture near its top to receive oil from the main oil reservoir of the lubricator permitting an amount of oil to be maintained within the housing having a level irrespective of the level of oil within the main oil reservoir.

4. In combination with a force feed lubricator having a main oil reservoir, pumping units and a transverse shaft forming an actuating member therefor within the reservoir, the said shaft having a laterally sliding and vertically rocking motion, a ratchet mechanism comprising a cup-shaped housing, a shaft, driving pawls and a support therefor, counter-driving pawls and a support plate therefor, gears mounted around the shaft for engaging the said pawls and disposed between the said driving pawl support and counterpawl support plate, the said shaft being journalled in the said pawl support plate, the said plate having an aperture above the said shaft for admission of oil from the main reservoir of the lubricator to the said housing, means outside of the housing to operate the said shaft, and means within the lubricator and at the end of the said shaft to operate directly the actuating member of the said pumping units, the entire ratchet mechanism together with the said operating means outside of the housing and the said means within the lubricator to operate directly the actuating member being adapted to be withdrawn from one side of the lubricator as an assembled unit.

5. In combination with a force feed lubricator having a main oil reservoir, pumping units and a transverse shaft forming an actuating member therefor within the reservoir, the said shaft having a laterally sliding and vertically rocking motion, mechanism consisting of a ratchet device comprising a cup-shaped housing, a shaft, driving pawls and a support therefor, counter-driving pawls and a support plate therefor, gears mounted around the shaft for engaging the said pawls and disposed between the said driving pawl support and counterpawl support plate, the said shaft being journalled in the said pawl support and counterpawl support plate, the said plate having an aperture above the said shaft for admission of oil from the main reservoir of the lubricator to the said housing, means outside of the housing to operate the said shaft, and means within the lubricator and at the end of the said shaft to operate directly the actuating member of the said pumping units, the said mechanism being adapted to be withdrawn entirely from one side of the lubricator as an assembled unit.

BENGT E. FOLKE.
WALTER E. WOLLHEIM.